(12) United States Patent
Larson

(10) Patent No.: US 7,267,079 B1
(45) Date of Patent: Sep. 11, 2007

(54) PORTABLE MULTI-PURPOSE CATTLE CARE APPARATUS

(76) Inventor: Briann W. Larson, 36274 250th St., Kimball, SD (US) 57355

( * ) Notice: Subject to any disclaimer, the term of this patent is extended or adjusted under 35 U.S.C. 154(b) by 120 days.

(21) Appl. No.: 11/055,208

(22) Filed: Feb. 10, 2005

(51) Int. Cl.
*A01K 29/00* (2006.01)

(52) U.S. Cl. ..................... 119/658; 119/661

(58) Field of Classification Search ........... 119/658, 119/652, 656, 660, 661, 662, 663, 666, 667
See application file for complete search history.

(56) References Cited

U.S. PATENT DOCUMENTS

| | | | | |
|---|---|---|---|---|
| 1,216,081 A | * | 2/1917 | Cox ....................... | 119/658 |
| 2,690,162 A | * | 9/1954 | Kremer ................ | 119/658 |
| 2,988,051 A | * | 6/1961 | Minock ................ | 119/658 |
| 3,038,445 A | * | 6/1962 | Fleming ............... | 119/656 |
| 3,055,340 A | * | 9/1962 | Davis .................. | 119/656 |
| 3,103,916 A | * | 9/1963 | Keene .................. | 119/656 |
| 3,137,274 A | | 6/1964 | Palmer | |
| 3,203,400 A | * | 8/1965 | Hesse .................. | 119/656 |
| 3,283,748 A | * | 11/1966 | Petersen .............. | 119/658 |
| 3,306,264 A | * | 2/1967 | Berens ................ | 119/658 |
| 3,538,891 A | * | 11/1970 | Williams ............. | 119/658 |
| 3,727,586 A | | 4/1973 | Brewster | |
| 3,913,530 A | | 10/1975 | Smith | |
| 3,918,408 A | * | 11/1975 | Keene .................. | 119/658 |
| 4,014,294 A | | 3/1977 | Hovorak | |
| 4,324,202 A | | 4/1982 | Stonestreet et al. | |
| 4,567,856 A | | 2/1986 | Sorenson | |
| 4,580,529 A | | 4/1986 | Wilson | |
| 4,748,939 A | | 6/1988 | Cocke, Jr. et al. | |
| 5,056,467 A | | 10/1991 | Schaefer | |
| 5,255,633 A | * | 10/1993 | Laurenz ............... | 119/658 |
| 5,456,212 A | * | 10/1995 | Gross .................. | 119/658 |
| 5,666,906 A | | 9/1997 | Moore et al. | |
| 6,035,807 A | * | 3/2000 | Burns .................. | 119/652 |
| 6,675,738 B1 | | 1/2004 | Kemnitz | |
| 6,966,276 B2 | * | 11/2005 | Dollar .................. | 119/667 |

OTHER PUBLICATIONS

Ann Toner, "Feed on the Move," Dakota Farmer, ( Feb. 9, 2005).
OUTPOST, "For Happier Cattle and Healthier Hides," ( Feb. 9, 2002).
Easy Way Cattle Oilers Ltd., "Animal Health and Pest Control," easywaycattleoilers.com, p. 1-4.
Lewis Cattle Oilers Co. Ltd., "Cattle Oilers," www.lewiscattleoilers.com, p. 1-3.
Easy Way Cattle Oilers Ltd., "Animal Health/Pest Contrl," wwweasywaycattleoilers.com, p. 1-6, ( Aug. 10, 2004).

* cited by examiner

*Primary Examiner*—Yvonne R. Abbott

(57) ABSTRACT

A portable multi-purpose cattle care apparatus for providing an easily transportable cattle care station. The portable multi-purpose cattle care apparatus includes a frame assembly having an integrated tank for holding a treatment composition. The tank is coupled to a livestock oiler device in use to provide a distribution apparatus for the treatment composition. The tank is preferably sloped from one side to the other to facilitate gravity flow of the treatment composition. The frame assembly may also be used to support additional livestock care implements such as salt, mineral, and livestock dusters.

18 Claims, 5 Drawing Sheets

PORTABLE MULTI-PURPOSE CATTLE CARE APPARATUS

BACKGROUND OF THE INVENTION

1. Field of the Invention

The present invention relates to mobile livestock feeding and pest control devices and more particularly pertains to a new portable multi-purpose cattle care apparatus for providing an easily transportable cattle care station capable of supporting a variety of cattle care implements including salt, mineral, a livestock oiler, and a livestock duster.

2. Description of the Prior Art

The use of mobile livestock feeding and pest control devices is known in the prior art. One illustrative example of these previously known devices includes U.S. Pat. No. 6,675,738 to Kemnitz, which teaches a mobile livestock feeder. The apparatus of the U.S. Pat. No. 6,675,738 patent utilizes an oiler tank which is mounted on a gooseneck hitch arm and does not have any slope or cant to the tank which would facilitate either filling or draining the tank.

Another illustrative example of previously known devices is U.S. Pat. No. 3,727,586 to Brewster which discloses a livestock oiler which utilizes a tank suspended between two sets of pipe legs. Again the tank is designed to be maintained in a level condition when the apparatus is placed on level ground, but placement on an uneven or non-level ground (such as is commonly found in pastures). This design may deprive one or both spray assemblies of oil even if oil remains in the tank, no slope to the tank is provided, especially since the oiler tank is connected to both sets of pipe legs at opposite ends of the device.

Thus, under conditions that are often found in pastures and field, the know oilers can prematurely stop dispensing oil before their tanks are actually empty.

In these respects, the portable multi-purpose cattle care apparatus according to the present invention substantially departs from the conventional concepts and designs of the prior art, and in so doing provides an apparatus primarily developed for the purpose of providing an easily transportable cattle care station capable of supporting a variety of cattle care implements including salt, mineral, a livestock oiler, and a livestock duster.

SUMMARY OF THE INVENTION

In view of the foregoing disadvantages inherent in the known types of mobile livestock feeding and pest control devices now present in the prior art, the present invention provides a new portable multi-purpose cattle care apparatus construction wherein 50 the same can be utilized for providing an easily transportable cattle care station.

To attain this, the present invention generally comprises a frame assembly having an integrated tank for holding a treatment composition. The tank is coupled to a livestock oiler device in use to provide a distribution means for the treatment composition. The tank is preferably sloped from one side to the other to facilitate gravity flow of the treatment composition. The frame assembly may also be used to support additional livestock care implements such as salt, mineral, and livestock dusters.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the lightweight physical configuration which allows for easy transport of the device by a single individual.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
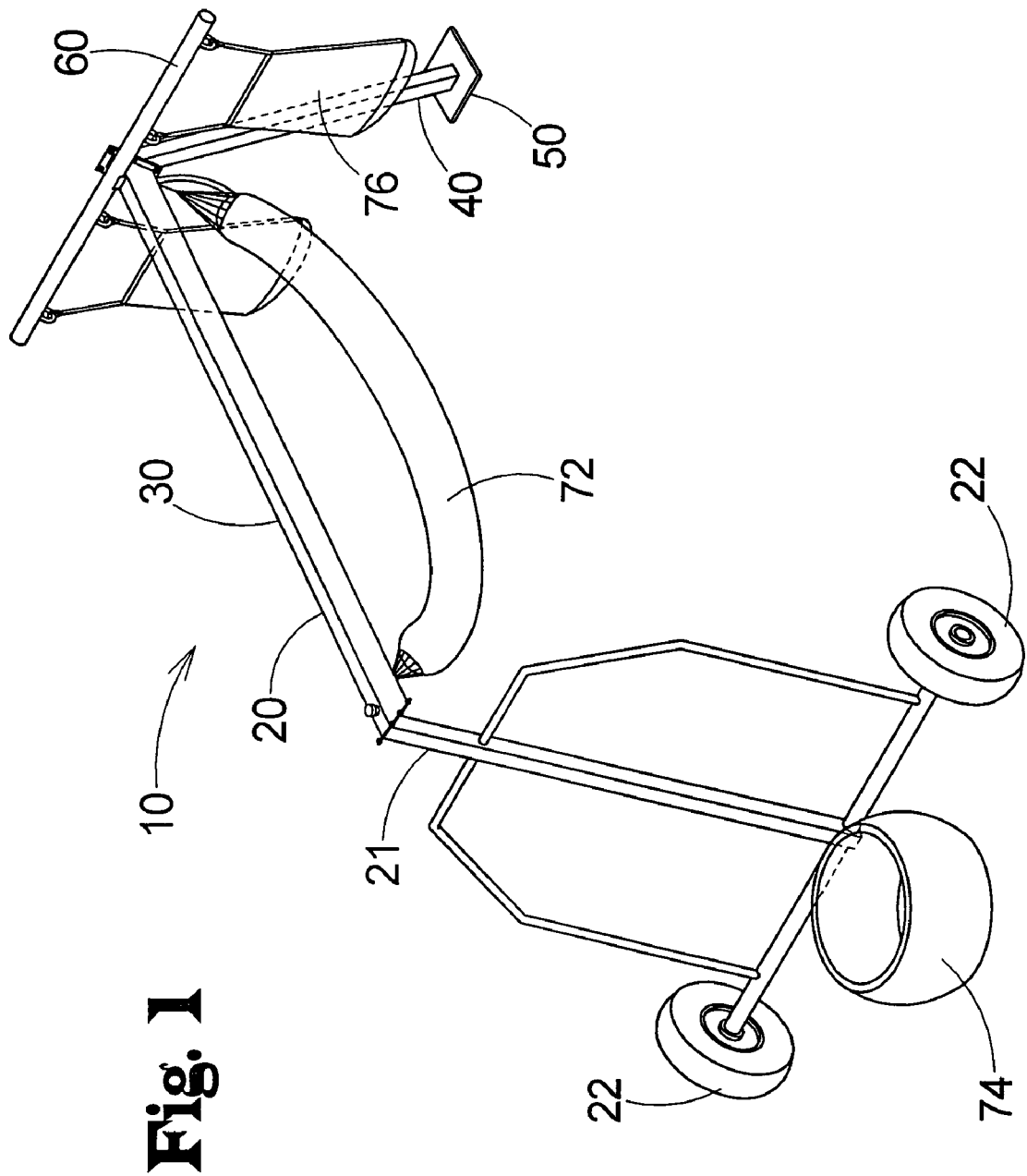
FIG. 1 is a schematic perspective view of a new portable multi-purpose cattle care apparatus according to the present invention.
Figure 2:
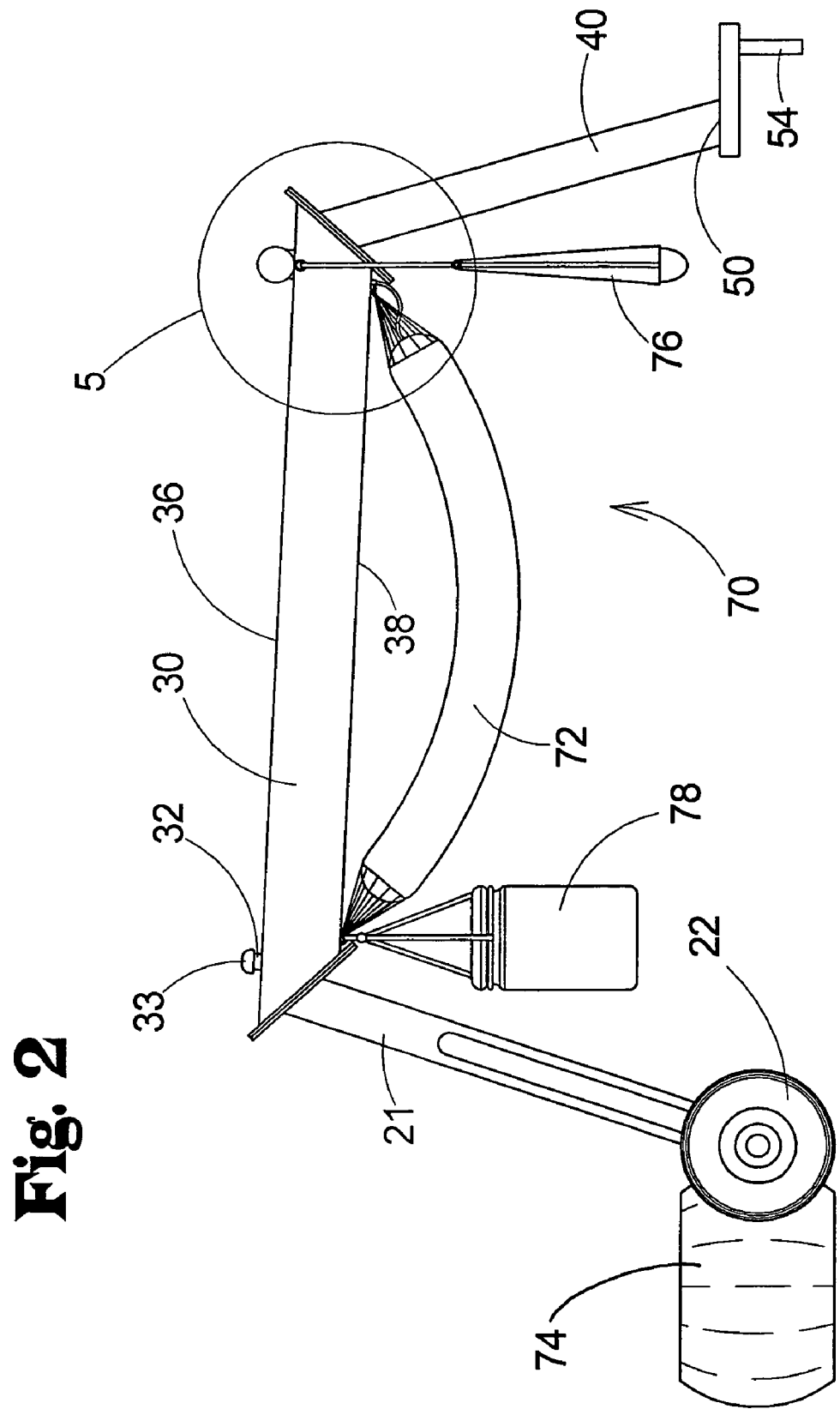
FIG. 2 is a schematic side view of the present invention.
Figure 3:
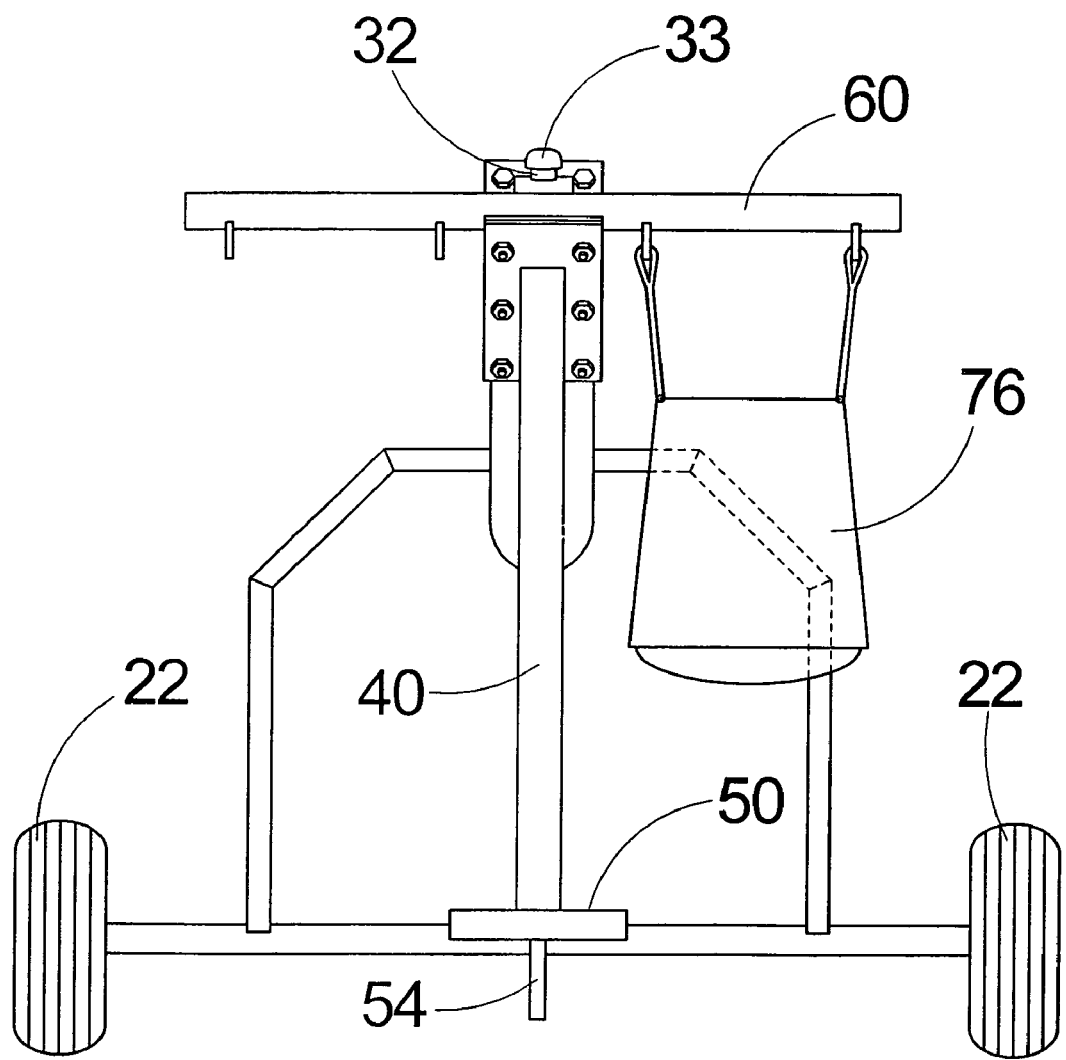
FIG. 3 is a schematic front view of the present invention.

With reference now to the drawings, and in particular to FIGS. 1 through 5 thereof, a new portable multi-purpose cattle care apparatus embodying the principles and concepts of the present invention and generally designated by the reference numeral 10 will be described.

As best illustrated in FIGS. 1 through 6, the portable multi-purpose cattle care apparatus 10 generally comprises a frame assembly 20 for supporting a variety of livestock servicing implements 70. The frame assembly 20 further includes a reservoir section 30, a rear section 21 and a tongue section 40. The frame assembly 20 may be disassembled for storage and shipping, or simply transporting over long distances where simply trailering the apparatus is not possible or desirable. To this end, the sections of the frame assembly 20 may be provided with flanges that are fastenable together by bolts, although other connection means may be employed.

A livestock oiler device 72 may be suspended from the frame assembly 20 for applying a treatment composition 71 to livestock when the livestock rubs against the livestock oiler device 72.

The reservoir section 30 is preferably positioned in a spaced relationship above the ground when in use and includes a treatment composition storage tank 31. Preferably, the treatment storage tank 31 is integrated into the frame assembly and actually forms a large portion of the reservoir section of the frame assembly. The reservoir section 30 is supported by the rear section 21 of the frame assembly and the tongue section 40 of the frame assembly.

In a significant feature of the invention, the portion of the reservoir section 30 that is located adjacent to the rear section 21 is supported at a relatively greater (farther) distance from the ground and the portion of the reservoir section 30 adjacent to the tongue section 40 is supported at a relatively closer distance to the ground. As a result, the reservoir section 30 is inclined and slopes downwardly from the rear section of the frame assembly to the tongue section of the frame assembly so that the treatment composition fluid is urged to flow towards the tongue section by gravity.

In at least one embodiment, the reservoir section 30 further comprises a fill port 32, a cap member 33, and a drain port 34. The fill port 32 is preferably positioned on a top side 36 of the reservoir section 30 and adjacent to the rear section 21 of the frame assembly 20. The fill port 32 is in environmental communication with the treatment composition tank 31 and is used to fill the treatment composition tank 31 with the treatment composition prior to use. The cap member 33 may be selectively coupled to the fill port 32 to selectively close the fill port 32 and inhibit contaminants from entering the treatment composition tank 31 through the fill port 32. The drain port 34 is preferably positioned on a lower portion 38 of the reservoir section 30 adjacent to the tongue section 40 and is most preferably located at substantially the lowest location on the reservoir to facilitate substantially complete drainage of the reservoir. The drain port 34 is in environmental communication with the treatment composition tank 31. The drain port 34 permits the treatment composition to flow outward from the treatment composition tank 31. The drain port 34 is removably connectable to a conduit 73 to the oiler device 72 in a known manner.

The rear section 21 may be provided with at least one wheel 22 to facilitate rolling the frame assembly 20 across the ground when the livestock and the apparatus is moved to another location such as another field for grazing. Preferably, a pair of wheels 22 is mounted on the rear section of the frame assembly. Each one of the pair of wheels 22 may be rotatably coupled to a lower portion of the rear section 21 to support the rear section off of the ground.

The frame assembly 20 may include a support plate 50 coupled to a lower portion of the tongue section 40. The support plate provides an enlarged surface area for the tongue portion 40 to contact the ground, which is especially beneficial for use on soft ground, such as soil in fields, so that the end of the tongue does not become lodged in the ground due to its weight.

The frame assembly 20 may also include a stake member 54 that is mounted to an underside of the support plate 50, and which serves multiple functions. Most importantly, the stake member 52 is insertable into the ground of the field and this penetration inhibits the frame assembly 20 from moving across the ground when the assembly is positioned in a field. Additionally, the stake member 54 may be employed as a hitch member for removably coupling the frame assembly 20 to a complementary hitch structure (such as a loop) on a vehicle to facilitate pulling or trailering of the apparatus across the ground.

In a further embodiment, a mineral feeder drum 74 is mounted on the lower portion of the rear section 21. The mineral feeder drum 74 receives a mineral, such as salt, to be fed to the livestock. The mineral feeder drum 74 is positionable substantially opposite of the wheels 22 to inhibit the frame assembly 20 from rolling across the ground or from rotating. Additionally, a mineral feeder barrel 78 may be suspended from the frame assembly 20, and preferably is suspended from the reservoir section 30 of the frame assembly 20. This barrel 78 may also be employed to hold other livestock servicing materials.

A duster support frame 60 may be coupled to the frame assembly 20 to support at least one, and preferably a pair of, duster bag devices 76. The duster support frame 60 may be oriented substantially perpendicular to the reservoir section 30 of the frame assembly, and may also be substantially horizontal orientation in a spaced relationship above the ground.

In an embodiment, the rear section 21 is oriented at an obtuse angle with respect to a longitudinal axis of the reservoir section 30 to improve the stability of the apparatus, especially when bumped by the livestock, by resisting tipping of the frame assembly rearwardly. The rear section 21 of the frame assembly may also include lateral arms that support an axle on which the pair of wheels are mounted.

Figure 4:
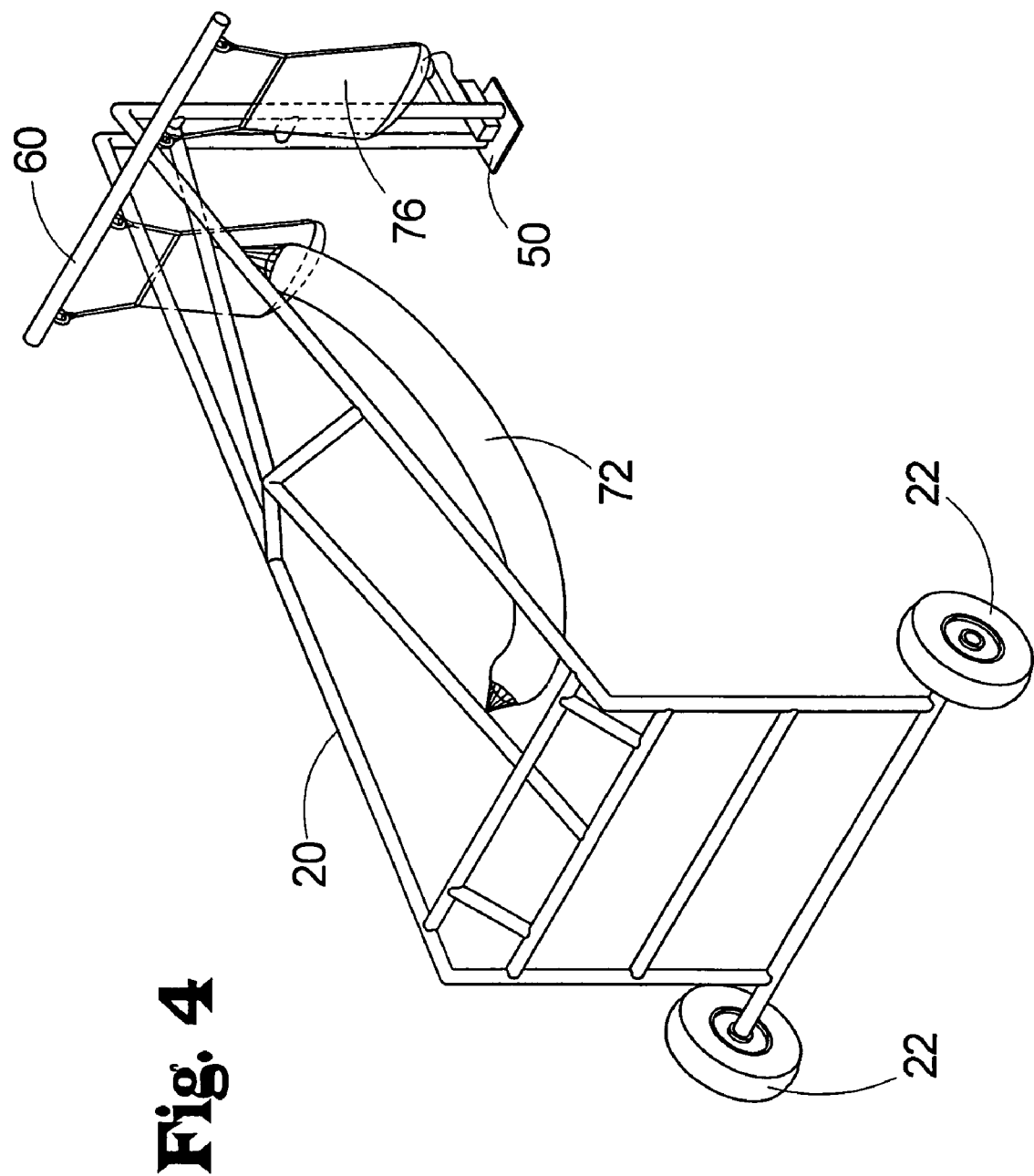
FIG. 4 is a schematic perspective view of the present invention utilizing multiple uprights members for the rear and tongue sections.
Figure 5:
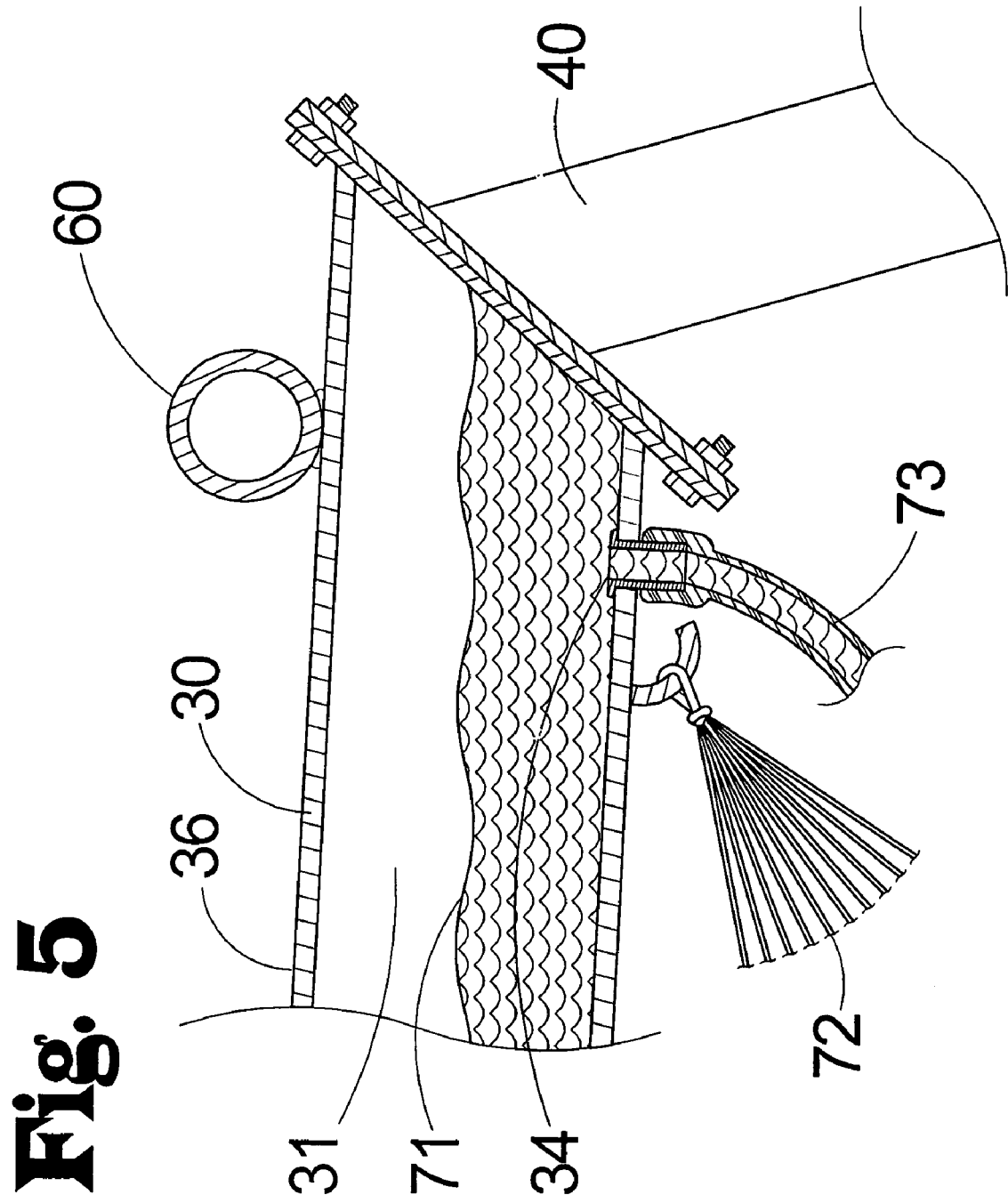
FIG. 5 is an enlarged, sectional view of the portion of FIG. 2 indicated by the circle marked "5".

The rear section 21 and the tongue section 40 may each comprise single or multiple uprights as well as cross-braces and corner support bracket so that portions of the frame assembly resemble a ladder (see, for example, FIG. 4).

In an illustrative embodiment, the reservoir section is approximately 140 inches long, the tongue section is approximately 72 inches long, and the rear section is approximately 80 inches long.

In use, the frame assembly is initially assembled from the rear section, the tongue section and the reservoir section. The reservoir section may be joined to the rear section and the tongue section using a bolted flange configuration, a pinned tab and slot configuration, a dovetail configuration or other suitable mechanical connection. The frame assembly may be positioned in a desired location for use and populated with at least one of the variety of livestock care implements including salt, mineral, a livestock oiler, and a livestock duster. The frame assembly with or without the livestock care implements may be moved or repositioned as desired by lifting up the tongue section and either rolling the frame assembly or coupling the frame assembly to a vehicle using the hitch member to facilitate transporting the apparatus to another desired location. Even if the invention is located on an uneven or non-level area of ground, the user merely detects approximately which spot is the highest or nearly the highest spot in the area, and positioned the rear section of the frame assembly at or near that spot, and the slope built into the assembly facilitates substantially complete draining of the reservoir.

The frame assembly does not need to be disassembled to be moved from one location to another or to be stored, although each of these is possible. The original shipment to the user in a disassembled fashion allows for more efficient use of space. Additionally should a replacement be needed for one of the main sections, replacement can be performed rapidly without the need to physically cut or weld the main section.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-purpose cattle care apparatus for improving and maintaining the condition of livestock and their hides, the apparatus comprising:
    a frame assembly having a tongue section, a reservoir section configured to store a treatment composition, and a rear section, the tongue section and the rear section extending downwardly from the reservoir section to support the reservoir section in a spaced, elevated relationship above the ground; and
    a livestock oiler device suspended from the frame assembly and configured to apply the treatment composition to livestock when the livestock rubs against the livestock oiler device;
    wherein the frame assembly further comprises:
        a support plate coupled to a lower portion of the tongue section for providing an enlarged surface area for the tongue portion to contact the ground;
        a stake member mounted on an underside of the support plate for penetrating a surface of ground below the support plate to inhibit the frame assembly from moving in a linear direction across the ground;
    wherein the stake member is configured to function as a hitch member for selectively coupling the frame assembly to a vehicle to facilitate transportation of the apparatus across the ground.

2. The multi-purpose cattle care apparatus of claim 1, wherein the frame assembly is configured to permit disassembly of the tongue section, the reservoir section and the rear section of the frame assembly into separate parts.

3. The multi-purpose cattle care apparatus of claim 1, wherein the reservoir section further comprises a treatment composition storage tank for storing the treatment composition, said treatment composition storage tank being in environmental communication with the livestock oiler device to facilitate flow of the treatment composition to the livestock oiler device.

4. The multi-purpose cattle care apparatus of claim 3, wherein the reservoir section is supported by the rear section and the tongue section with the portion of the reservoir section adjacent to the rear section being relatively farther from the ground and the portion of the reservoir section adjacent to the tongue section being relatively closer to the ground whereby the reservoir section slopes downwardly from the rear section to the tongue section and the treatment composition flows towards the tongue section.

5. The multi-purpose cattle care apparatus of claim 1, wherein the rear section further comprises at least one wheel member rotatably coupled to a lower portion of the rear section to facilitate rolling the frame assembly across the ground.

6. The multipurpose cattle care apparatus of claim 1, wherein the rear section is oriented at an obtuse angle with respect to a longitudinal axis of the reservoir section.

7. The multi-purpose cattle care apparatus of claim 1 wherein the reservoir section is positioned in a spaced relationship above the ground when in use and includes a treatment composition storage tank, the reservoir section is supported by the rear section and the tongue section with the portion of the reservoir section adjacent to the rear section being relatively father from the ground and the portion of the reservoir section adjacent to the tongue section being relatively closer to the ground whereby the reservoir section slopes downwardly from the rear section to the tongue section and the treatment composition flows towards the tongue section;
    the reservoir section further comprises: a fill port positioned on a top side of the reservoir section and adjacent to the rear section of the frame assembly, said fill port being in environmental communication with the treatment composition tank;
    a cap member selectively coupled to the fill port to inhibit contaminants from entering the treatment composition tank; and
    a drain port positioned on a lower portion of the reservoir section adjacent to the tongue section, the drain port being in environmental communication with the treatment composition tank, the drain port permitting the treatment composition to flow from the treatment composition tank towards the livestock oiler device; the rear section further comprises a pair of wheel members, each one of the pair of wheel members is rotatably coupled to a lower portion of the rear section to facilitate rolling the frame assembly across the ground, the frame assembly further comprising:
    a mineral feeder drum operationally coupled to the lower portion of the rear section, said mineral feeder drum being for selectively receiving a mineral to be fed to the livestock, the mineral feeder drum is positionable substantially opposite the at least one wheel member to inhibit the frame assembly from rolling across the ground;
    a duster support frame extending substantially perpendicularly from the reservoir section in a spaced substantially horizontal relationship above the ground, the duster support frame providing support for at least one duster bag device.

8. The multipurpose cattle care apparatus of claim 7, wherein the rear section is oriented at an obtuse angle with respect to a longitudinal axis of the reservoir section.

9. The A multi-purpose cattle care apparatus, for improving and maintaining the condition of livestock and their hides, the apparatus comprising:
    a frame assembly having a tongue section, a reservoir section, and a rear section, the tongue section and the rear section supporting the reservoir section in a spaced relationship above the ground; and
    a livestock oiler device suspended from the frame assembly, said livestock oiler device applying a treatment composition to livestock when the livestock rubs against the livestock oiler device;
    wherein the reservoir section further comprises a treatment composition storage tank for storing the treatment composition, said treatment composition storage tank being in environmental communication with the livestock oiler device to facilitate flow of the treatment composition to the livestock oiler device;

wherein the frame assembly is configured such that the treatment composition storage tank is oriented with one end of the tank being positioned relatively higher than an opposite end of the tank when the frame assembly is positioned on substantially level ground.

10. A multi-purpose cattle care apparatus, for improving and maintaining the condition of livestock and their hides, the apparatus comprising:
   a frame assembly having a tongue section, a reservoir section, and a rear section, the tongue section and the rear section supporting the reservoir section in a spaced relationship above the ground; and
   a livestock oiler device suspended from the frame assembly, said livestock oiler device applying a treatment composition to livestock when the livestock rubs against the livestock oiler device;
   wherein the reservoir section further comprises a treatment composition storage tank for storing the treatment composition, said treatment composition storage tank being in environmental communication with the livestock oiler device to facilitate flow of the treatment composition to the livestock oiler device;
   wherein said frame assembly further comprises a mineral feeder drum operationally coupled to the rear section, said mineral feeder drum being for selectively receiving a mineral to be fed to the livestock.

11. The multipurpose cattle care apparatus of claim 10, wherein the mineral feeder drum is positionable substantially opposite the at least one wheel member to inhibit the frame assembly from rolling across the ground.

12. A multi-purpose cattle care apparatus for improving and maintaining the condition of livestock and their hides, the apparatus comprising:
   a frame assembly having a tongue section, a reservoir section, and a rear section, the tongue section and the rear section supporting the reservoir section in a spaced relationship above the ground; and
   a livestock oiler device suspended from the frame assembly, said livestock oiler device applying a treatment composition to livestock when the livestock rubs against the livestock oiler device;
   wherein the frame assembly further comprises a duster support frame extending substantially perpendicularly from the reservoir section in a spaced substantially horizontal relationship above the ground, the duster support frame providing support for at least one duster bag device.

13. A multi-purpose cattle care apparatus for improving and maintaining the condition of livestock and their hides, the apparatus comprising:
   a tongue section having a lower portion and an upper portion, the lower portion abutting the ground when the apparatus is in use;
   a rear section having a rear lower portion and a rear upper portion, the rear section having at least one wheel rotatably coupled to the rear lower section, the at least one wheel abutting the ground when the apparatus is in use;
   a reservoir section extending between the upper portion of the tongue section and the rear upper portion, a reservoir section having a treatment composition storage tank for storing a treatment composition, said reservoir section sloping downwardly from the rear section towards the tongue section to facilitate flow of the treatment composition;
   the rear section being oriented at an obtuse angle with respect to a longitudinal axis of the reservoir section;
   a duster support frame operationally couplable to the reservoir section, said duster supper frame extending substantially perpendicularly from the reservoir section in a spaced substantially horizontal relationship above the ground, the duster support frame providing support for at least one duster bag device;
   said rear section, reservoir section, tongue section, and duster support frame being selectively coupled to form a frame assembly, the frame assembly supporting a variety of livestock servicing implements.

14. The multi-purpose cattle care apparatus of claim 13, wherein the reservoir section further comprises:
   a fill port positioned on a top side of the reservoir section and adjacent to the rear section of the frame assembly, said fill port being in environmental communication with the treatment composition tank;
   a cap member selectively coupled to the fill port to inhibit contaminants from entering the treatment composition tank; and
   a drain port positioned on a lower portion of the reservoir section adjacent to the tongue section, the drain port being in environmental communication with the treatment composition tank, the drain port permitting the treatment composition to flow from the treatment composition tank.

15. The multi-purpose cattle care apparatus of claim 13, wherein the frame assembly further comprises:
   a support plate coupled to a lower portion of the tongue section the support plate providing an enlarged surface area for the tongue portion to contact the ground;
   a stake member operationally coupled to the tongue section below the support plate, the stake member inhibiting the frame assembly from moving in a linear direction across the ground.

16. The multi-purpose cattle care apparatus of claim 15, wherein the support plate further comprises a hitch member for selectively coupling the frame assembly to a vehicle to facilitate transportation of the apparatus across the ground.

17. The multi-purpose cattle care apparatus of claim 13, wherein said frame assembly further comprises a mineral feeder drum operationally coupled to the lower portion of the rear section, said mineral feeder drum being for selectively receiving a mineral to be fed to the livestock.

18. The multipurpose cattle care apparatus of claim 17, wherein the mineral feeder drum is positionable substantially opposite the at least one wheel member to inhibit the frame assembly from rolling across the ground.

* * * * *